Jan. 22, 1957  L. DEBUIT  2,778,450
ACCUMULATOR FOR MECHANICAL ENERGY
Filed Nov. 24, 1954  4 Sheets-Sheet 1

INVENTOR
LOUIS DEBUIT.
BY *Heinrich Hochschild*
ATTORNEY

Jan. 22, 1957   L. DEBUIT   2,778,450
ACCUMULATOR FOR MECHANICAL ENERGY
Filed Nov. 24, 1954   4 Sheets-Sheet 2

INVENTOR
LOUIS DEBUIT.
BY
ATTORNEY

Jan. 22, 1957   L. DEBUIT   2,778,450
ACCUMULATOR FOR MECHANICAL ENERGY
Filed Nov. 24, 1954   4 Sheets-Sheet 3
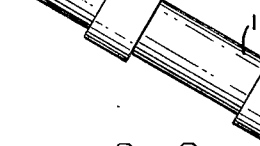
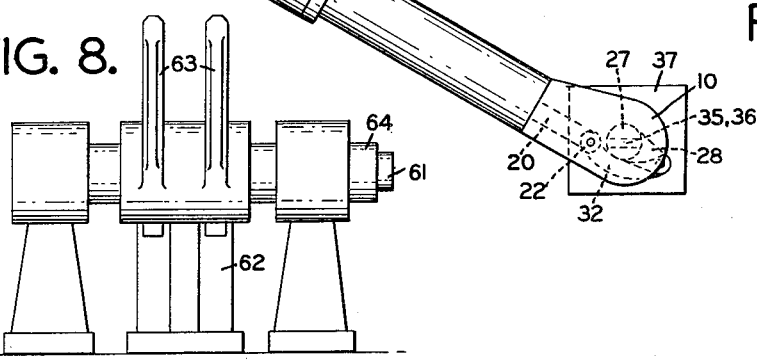
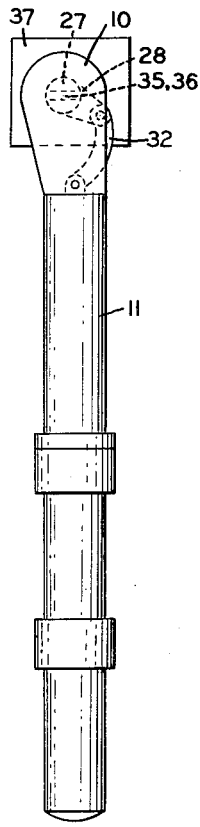
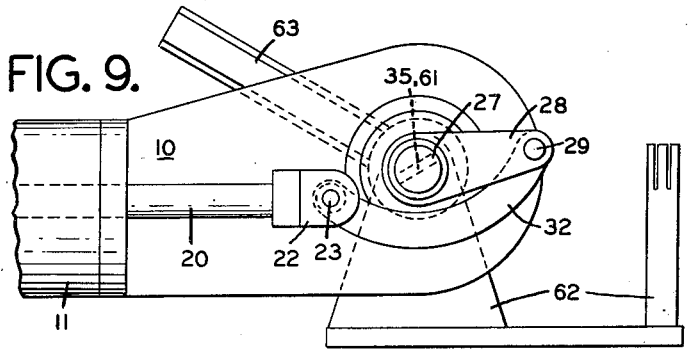
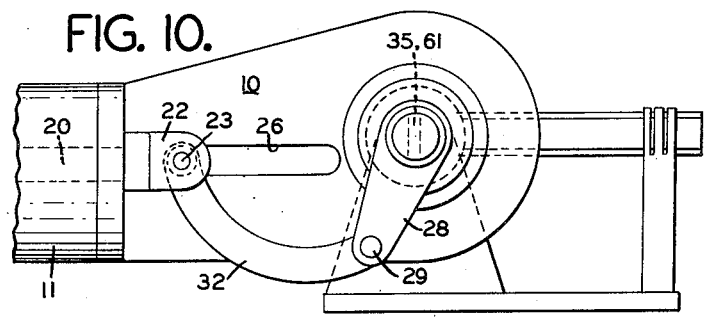
INVENTOR
LOUIS DEBUIT.
BY *Heinrich Hochschild*
ATTORNEY

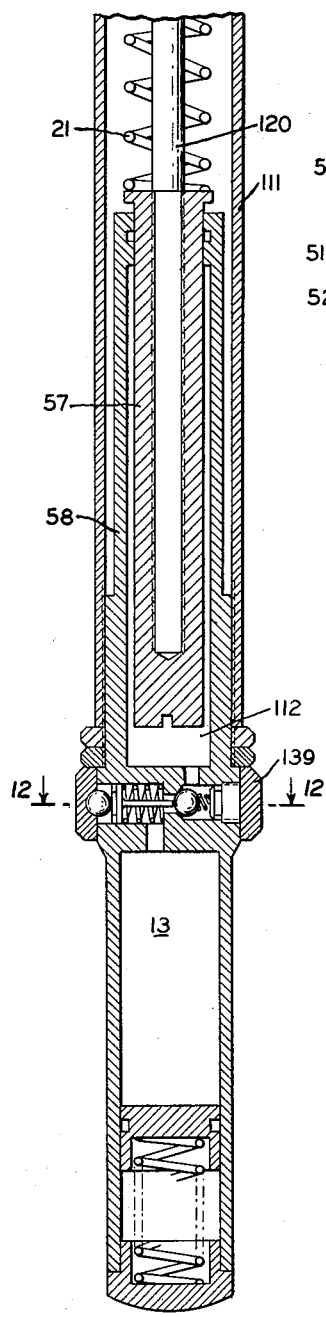
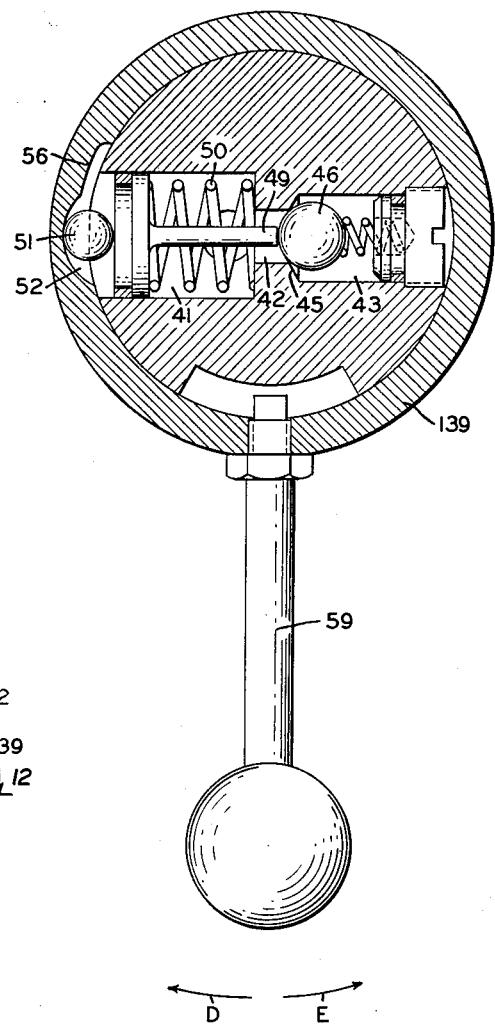
INVENTOR
LOUIS DEBUIT.

United States Patent Office 2,778,450
Patented Jan. 22, 1957

2,778,450

ACCUMULATOR FOR MECHANICAL ENERGY

Louis Debuit, Grenoble, France, assignor to Établissements Merlin & Gerin, Grenoble, France Application November 24, 1954, Serial No. 471,000

Claims priority, application France December 9, 1953

15 Claims. (Cl. 185—37)

The invention is concerned with a device through and within which mechanical energy may be stored and, subsequently, at any convenient time, released.

Particularly, the invention has for its object an accumulator for mechanical energy in which the energy may be stored by a slow continuous or discontinuous effort and may be released abruptly or instantaneously.

It is a further object of the invention to provide an accumulator in form of a structural unit in which an elastic system and a driving mechanism are combined, the driving mechanism to be employed as a generator for loading the elastic system with mechanical energy and, subsequently, as a motor upon which the energy accumulated in the elastic system is discharged for operating the actuating member of any appropriate apparatus.

The unit is further to comprise check means for holding the elastic system in tensioned and loaded condition until by means of certain control organs or tripping means the stored energy is to be released upon the driving mechanism. An object of the invention thus is a unit which, with the driving mechanism operative as generator, may be transitorily applied to an instrument or apparatus which, operated as motor, will charge the device. Subsequently the charged unit is to be applied to a member, such as a lever, switch blade of a circuit breaker, switch, or to the actuating member of any other apparatus which is to be pivoted or actuated from a non-operative position into an operative position or conversely.

In accordance with the invention, the accumulator for mechanical energy comprises as a structural unit, such as in form of a hollow cylindrical handle bar, an elastic system and a driving mechanism operatively connected therewith for loading the elastic system with mechanical energy and subsequently receiving the stored energy therefrom. The driving mechanism includes a coupling member accessible from the outside and adapted for pivotal motion about a chosen angle so as to constitute a means for controlling selectively the loading velocity and the quantity of the energy to be stored in the elastic system. This coupling member is further shaped and disposed for attaching and applying thereby said unit to a conformably shaped key for operating the driving mechanism and loading the elastic system. The key may be a stationary element mounted at any convenient place, wall, switch board or instrument board or panel, or otherwise. The unit may then be pivoted as a handle about the key in order to load the elastic system. Check means are associated with the elastic system for holding it in tensioned or loaded condition even after the unit had been removed from the key.

The device further includes a control or tripping means associated with the check means for releasing the check means when the unit is applied by means of its coupling member to a corresponding coupling member of an apparatus or instrument or appliance to be actuated by the device. To this member an intensive pivotal motion may thus be imparted.

The elastic system of the invention, which is to store and subsequently to release the energy, is constituted by a spring or another elastically compressible body or medium housed in a cylindric casing. The spring or other elastic body or medium is acted upon by, and may subsequently act upon a piston, reciprocatable in the cylindric casing and in driven and driving connection with the driving mechanism. The pivotal motion of the coupling member is thus converted into the translatory motion of the piston and, conversely, the translatory motion of the piston into the pivotal motion of the coupling member when the stored energy is released.

In accordance with a development of the invention, a hydraulic blocking system operating with an incompressible fluid, such as water or oil or another, is associated with the energy storing and subsequently releasing elastic system for blocking and holding, by means of the incompressible fluid, the elastic system tensioned until the energy stored in the elastic system is to be released upon the driving mechanism for imparting to a member coupled thereto the desired motion for the intended operation.

This hydraulic blocking system includes an incompressible fluid transmission, a recipient or cylinder space for receiving the displaced fluid, and a secondary elastic system housed in this recipient for returning the displaced fluid into the primary energy storing and releasing system. The secondary elastic system likewise comprises a spring or other elastic body or medium and a piston. The energy storing and releasing or primary elastic system, the fluid transmission, and the secondary elastic system are disposed in operative relationship, in series with one another for energy transmission in both senses from and to the driving mechanism.

When the primary system is being loaded, fluid will thus be displaced between the fluid spaces of both elastic systems in the one sense—from the fluid space of decreasing stroke volume to that of increasing stroke volume—and in the other sense, conversely, when the stored energy is being discharged.

Check and control means are arranged to be operative on the fluid transmission, in the exemplified embodiment, in a passage which connects the fluid spaces of the two elastic systems in the casing.

By means of the check means, as soon as the primary system is loaded to the desired degree, displacement of the incompressible fluid is blocked and thus the primary system held tensioned. By means of the control or tripping means, on the other hand, the check means is rendered ineffective and, while the primary elastic system discharges its energy upon the driving mechanism, return of the displaced fluid is made possible through the return motion of both pistons which between themselves and the walls of the cylinder spaces confine at any time a constant volume of the incompressible fluid.

These and other features of my invention will become apparent as the now ensuing specific description of my invention proceeds in which the invention will be described with reference to the accompanying drawings which form part of this specification and in which embodiments of the accumulator of my invention are illustrated by way of example, embodiments which are particularly suited to be employed at the manually operated switch lever of a current interrupter.

It will be readily understood, however, that the application of this accumulator is not limited to this purpose and also that the drawings are intended to be explicative of my invention but not limitative of its scope. Other embodiments incorporating the principle underlying my invention are feasible without departing from the spirit and ambit of my appended claims.

Figure 3:
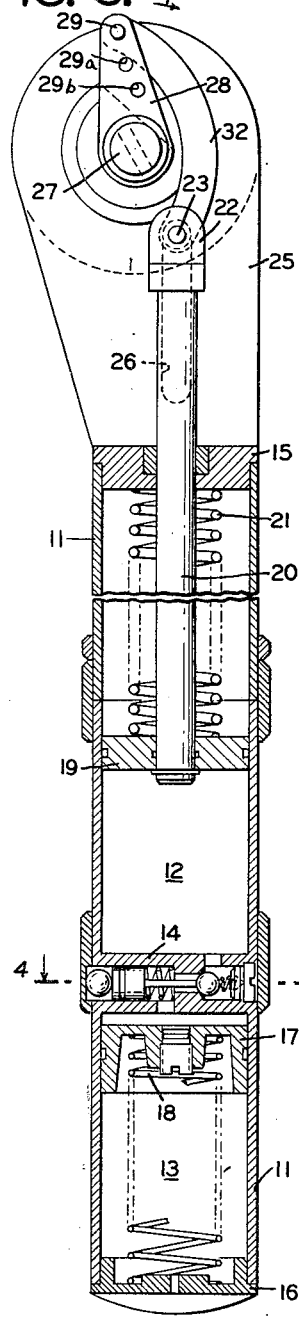
Fig. 3 is a longitudinal section of the accumulator shown in Fig. 1 but in tensioned or loaded condition.
Figure 5:
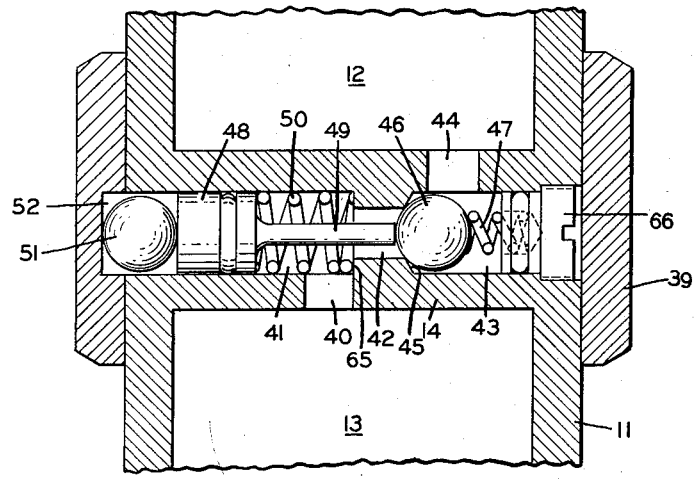
Figure 4:
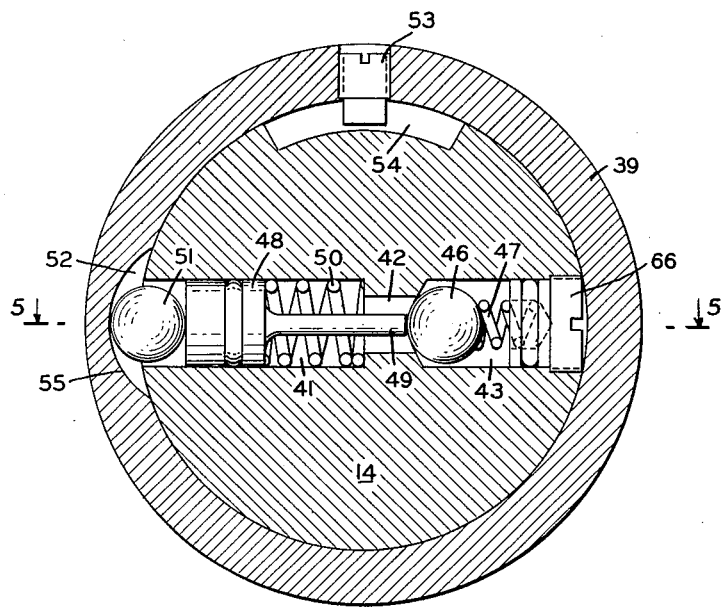

Figs. 4 and 5, respectively, are, on an enlarged scale, a plan section along line 4—4 of Fig. 3 and an elevational section along line 5—5 of Fig. 4;

Figs. 6 and 7 show schematically, on a reduced scale, the positions of the accumulator applied to a stationary key, respectively before and after loading with mechanical energy;

Fig. 8 is an elevational rear view of a switch adapted for operation by means of the accumulator of the invention;

Figs. 9 and 10 are side views of the switch of Fig. 8 with the accumulator applied to the shaft of the switch lever, respectively in the open and in the closed position of the switch and correspondingly charged and released positions of the accumulator, only the head of the accumulator being shown;

Fig. 11 is a fragmentary longitudinal section of a modification of the accumulator; and Fig. 12 is a section along line 12—12 of Fig. 11, on an enlarged scale, showing the check and control means of the accumulator of Fig. 11.

In the drawings, the accumulator unit, generally of the shape of a hand lever or handle bar, comprises a cylindric casing generally designated by 11 and a head generally designated by 10. The cylindric casing is subdivided through a partition 14 into two spaces 12, 13. The cylindric casing 11 is closed at the top end by a lid 15 and at its foot by a lid 16. A passage is provided through partition 14, the arrangement and function of which will be described hereinafter.

The primary, energy storing and subsequently releasing system comprises, in the embodiment illustrated, a compression spring 21. This spring bears with its one end against lid 15 and with its other end against a piston 19 connected to the driving mechanism of the accumulator which will be described immediately. A piston 17 with a compression spring 18, extended between piston 17 and lid 16, constitutes the secondary elastic system. The space between the pistons 19 and 17 is filled with an incompressible fluid, preferably oil.

The piston rod 20 traverses lid 15 and carries at its end the fork 22 which is connected to the driving mechanism of the accumulator. Fork 22 carries a pin 23 by means of which it may slide in slots 26 of side plates 24, 25, secured to lid 15. The driving mechanism comprises the crank shaft 27 journalled in ball bearings 30, 31 respectively mounted in the side plates 24, 25. The driving mechanism further comprises the crank arm 28 in form of a fork and of one piece with the crank shaft 27. Crank arm 28 carries the crank pin 29 which is connected with pin 23 by means of the arcuate connecting rod 32.

Crank shaft 27, at its one end, is shaped with a coupling member, in the embodiment illustrated, in form of a groove 35 which may be engaged by a comformably shaped tongue 36. This tongue may be secured to any stationary base 37, a switch board or panel for instance, and may thus be the coupling member or key for imparting to the crank shaft 27 a pivotal motion for loading the accumulator with mechanical energy as will be described hereinafter in detail. On the other hand, member 36 will be the coupling member of any apparatus, such as the shaft of the lever or blade of a switch or circuit breaker or other apparatus, instrument, or the like, upon which, for instance for the closing motion of a switch, the stored energy is to be discharged from the accumulator.

The partition 14, as Figs. 4 and 5 illustrate, is traversed diametrically by a cylindric bore comprising two length sections 41 and 43, the one, 41, connected by a duct 40 to cylinder space 13 and the other, 43, through duct 44 with cylinder space 12, and both, 41 and 43, connected through a conduit 42, one end of which forms the seat 45 of a check or non-return valve 46. A piston 48, displaceable in the cylindric bore 41, is urged from the one side by a spring 50 against a ball 51 on the other side. Spring 50 with its other end bears against the inwardly projecting edge 65 of conduit 42. Piston 48 is provided with a stem or push rod 49 for pushing the check valve ball 46 from its seat. Normally, ball 46 is held on seat 45 by means of valve spring 47. With its other end, spring 47 bears against the screw stopper 66 which closes the peripheral end of bore 43. A control ring 39 embraces the cylindric casing 11 at the location of the partition 14 and of the diametral bore 41, 42, 43. Control ring 39 is provided with a recess 52 into which, at a certain position of control ring 39, ball 51 may partially enter, and, urged by piston 48 and spring 50, may thus withdraw stem 49 from check valve ball 46. Ball 46 will then, under the bias of spring 47 and the prevailing fluid pressure from space 12, close the passage of the incompressible liquid through conduit 42 and therefore the passage of the liquid between the spaces 12 and 13.

Control ring 39 is further provided with a stop 53 which may slide in a groove 54 of partition 14, for thus limiting to both sides the deflection of control ring 39.

Figure 1:
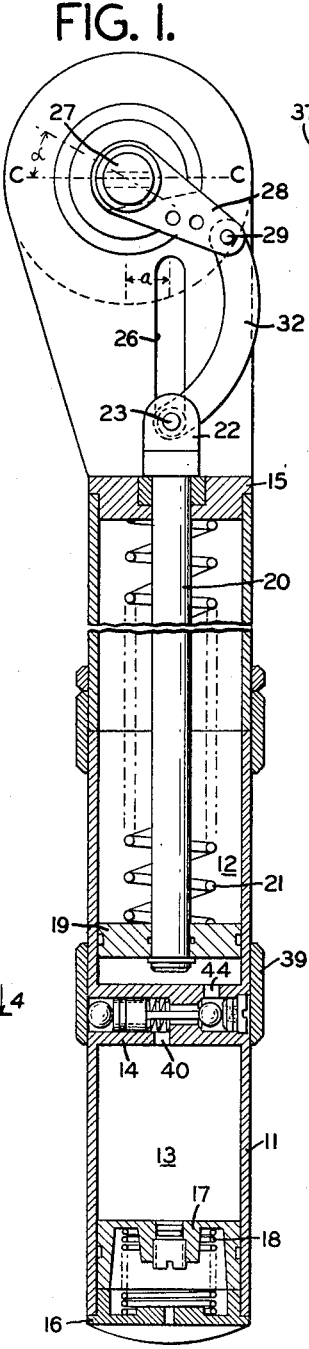
Fig. 1 is a longitudinal section, partly in view, of an accumulator for mechanical energy, in accordance with my invention, the accumulator being in untensioned condition.

The operation of the apparatus is as follows:

Starting from the unloaded apparatus, the parts are in the position illustrated in Fig. 1. The spring is released and the cylinder space 13 or fluid recipient filled, piston 17 is pressed back and spring 18 compressed.

In order to load the accumulator system, lever 11 is applied with groove 35 of its crank shaft 27 to the stationary or fixed tongue 36 mounted at a wall 37, at or near a switch board, or otherwise, the check and control means being in the position shown in Figs. 3 to 5. Lever 11 then is pivoted in the sense of arrow A, Figs. 1 and 6, towards the position of Fig. 7. Since during this movement shaft 27 and crank arm 28 are held stationary by the tongue and groove arrangement, connecting rod 32 will pivot about pin 29 and will thus exert a force on fork 22 which will draw the piston rod 20 outwards of the cylinder space 12, and piston 19 will thus compress the spring 21.

Figure 2:
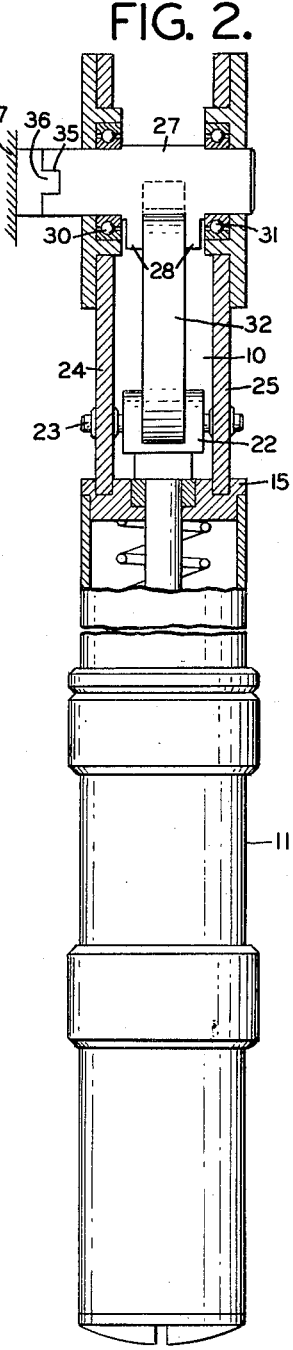
Fig. 2 is a side view of the same, partly in section.

Expansion of the fluid space at the opposite side, in Figs. 1 and 2 at the lower side of piston 19, reduces the pressure and the liquid within the space 13 will now be driven by piston 17, through expansion of spring 18, through the passage 40, 41, 42, 43, 44, provided in the partition 14, and will fill the cylinder space 12 between piston 19 and partition 14. Check valve 46 with proper design of springs 50 and 47, will be held open through the prevailing pressure from space 13 and ducts 40, 41 and 42.

When, after the lever 11 has been pivoted about a certain angle, the movement is stopped, spring 21 which had been tensioned to a certain extent will tend to expand. Such expansion, however, is not possible since the check valve 46, with the pressure in space 12 and conduits 44, 43 now prevailing, will prevent the return flow of the incompressible fluid from cylinder fluid space 12 to cylinder fluid space 13.

Complete compression of spring 21 may be achieved, be it by continuous operation, pivoting of lever 11 about key 36, or in successive steps interrupted by rest periods of desired duration.

When spring 21 is fully tensioned, in the present instance compressed, the various members of the device are in the position shown in Fig. 3.

Total compression of spring 21 corresponds to a certain pivotal angle which preferably equals the angle which the actuating shaft of a switch blade or of the contact piece of a circuit breaker is to describe for the closing of which the accumulator of the invention is to be employed. In the example illustrated by Figs. 5 to 10 this angle of rotation corresponds to 120°.

Fig. 6 shows the lever 11 in the position in which, in unloaded condition, the lever is assumed to be applied with its coupling member 35 to the stationary or fixed key member 36, 37. Fig. 7 then shows the position the lever 11 reaches at the end of the charging period, i. e. when the accumulator has been loaded with mechanical energy through compression of spring 21.

The lever so loaded is now disengaged from tongue 36 and engaged with an identically shaped tongue 61 at the actuating shaft 64 of the blade 63 of a switch 62 such as shown in Figs. 8 to 10 or at the actuating shaft of any other apparatus or instrument to be actuated by a pivotal motion.

Fig. 9 shows the open position of the switch with the accumulator unit applied to it. In order to close the switch, it will suffice to trip the accumulator and thus to release suddenly spring 21. This sudden release of spring 21 will be achieved by turning the ring 39 in either sense about an angle of a few degrees from the position shown in Figs. 3 to 5 into the position illustrated in Fig. 1.

Through its movement into this position, ring 39 will push ball 51 inwards against piston 48 and this piston, by means of its stem 49, will push, against the action of spring 50, check valve 46 inwards into bore space 43 and off its seat 45 against the action of spring 47. The liquid may now rapidly return into the cylinder fluid space 13 through the passage provided by the conduits 44, 43, 42, 41, 40.

Spring 21 will be so designed that the energy stored in it by compression will suffice for the closing of the switch, or the desired actuation of other apparatus, and for the compression of spring 18.

The sudden release of spring 21 will return piston 19, piston rod 20, and connecting rod 32 towards the position of Fig. 1 and crank arm 28 will be turned in the direction of arrow B, Fig. 3. Through the movement of the crank shaft 27 and of the coupling member 61 upon the actuating shaft 64 of the circuit breaker 62, the circuit breaker will be closed.

Lever 11 may now be disengaged from the coupling member 61 and engaged with the stationary tongue 36 for re-loading the accumulator, ring 39 having been returned into its rest position of Figs. 3 to 5.

In the case were large quantities of energy are to be stored in an accumulator of reduced dimensions, the piston 19 may be replaced by a plunger 57 as illustrated in Fig. 11. Considerably larger pressures may thus be obtained than those obtainable by the device of Fig. 1.

In the embodiment of Fig. 11 the plunger 57, actuated by the plunger rod 120, tensions or compresses the spring 21. In view of the considerable pressures which come into play, the plunger is no longer to slide on the inner wall of the cylindric casing but in a separate inner cylinder 58. The elevated pressure is thus confined within this cylinder whereas the other parts of the device are relieved from this pressure. Otherwise the operation is the same as described with reference to Figs. 1 to 5. In view of the elevated pressures, ring 139, instead of being operated directly, may be actuated by means of a handle 59, as shown in Fig. 12.

As means for storing the mechanical energy, coil springs have been shown in the embodiments of Figs. 1 to 3 and 11. It will be readily understood that instead of these coil springs other convenient or conventional elastic systems may be employed such as e. g. Belleville or cup springs, spiral springs, or others, or a combination of such means.

The various sizes or capacities of circuit breakers or other apparatus which may be actuated, such as closed, by the accumulator of the invention will of course require different quantities of energy for their actuation.

In order to simplify the holding of stock of the various parts or reduce their number or sizes, the same accumulator of the invention may be made adaptable to the various types or sizes of circuit breakers or other apparatus.

This will be achieved by providing on the crank arm 28 several pivotal axes or bores for the pin 29 or pins to which the connecting rod is secured, such as indicated in Figs. 1 and 3 at 29, 29a, 29b. By securing the connecting rod 32 at the one or the other of these axes, the stroke of piston 19 or of the plunger 57 may be made longer or shorter.

The stroke will be shortest when the connecting rod is secured with its pin at 29b, thus nearest to the axis of rotation of shaft 27. To each of the axes 29, 29a, 29b thus corresponds a predetermined stroke of the piston or plunger and consequently a predetermined compression of spring 21.

Thus, for a circuit breaker of smaller closing energy, an accumulator lever will be employed the connecting rod of which is secured to a pin at 29b.

Moreover, by a careful selection of the angle α at which, in the rest position of the device, Fig. 1, the crank arm 28 is set relatively to the axis C—C, the axis perpendicular to and intersecting the center axis of the crank shaft and perpendicular to the longitudinal axis of the piston and its rod, and also by proper selection of the distance a of the center axis of the crank shaft from the lonigtudinal axis, the moment exerted by the device upon the actuating shaft of the circuit breaker may be given a value which remains substantially constant during the release of spring 21.

Finally, the velocity of the release of this spring may be controlled by an appropriate shape of the contour 56 of the recess 52 which controls the deflection of ball 51 and thus the enforced opening of control valve 46, see Fig. 12. With the profile of this recess as shown in this figure, by turning the lever 59 in the sense of arrow D, clockwise, from the position illustrated in Fig. 12, ball 51 may rapidly be pushed fully into the bore space 41. A wide passage is thus opened between check valve 46 and its seat 45 and consequently liquid will rapidly flow from cylinder space 12 or 112 into the cylinder space 13 and, as a result, a very rapid release of spring 21 will be ensured.

Conversely, if the lever 59 is turned in the sense of arrow E, counter-clockwise, ball 51 will only slightly be pushed into the cylinder bore 41 and the check valve 46 will only slightly be lifted from its seat 45. The liquid will flow only very slowly from cylinder space 12 or 112 into the space or recipient 13 and, correspondingly, the spring 21 will only slowly be released. In this way, check valve 46 combined with recess 52 may serve also as a means for the control of the velocity of the release of the spring and thus of the velocity or impetus which is imparted to the device operated by the accumulator.

I claim:

1. An accumulator for mechanical energy comprising as a structural unit, an elastically compressible and expansible, energy storing and releasing system, a driving mechanism operatively connected therewith for loading said elastic system with mechanical energy and subsequently receiving the stored energy therefrom, a hydraulic blocking system for operation with an incompressible fluid associated with said elastic system and including fluid conducting means and variable volume fluid chambers for displacing said fluid in one direction during loading of said elastic system and by the same and thereupon blocking and holding by means of said incompressible fluid said elastic system tensioned, said unit further including control means associated with said hydraulic blocking system, thereby to allow displacement of said incompressible fluid in the opposite direction and release of said hydraulic blocking system, and thus to release the energy stored in the elastic system upon the driving mechanism and impart to an outside member coupled thereto an intensive motion.

2. An accumulator for mechanical energy comprising as a structural unit a primary elastic, energy storing and releasing system, a driving mechanism operatively connected therewith for loading said primary elastic system with mechanical energy and subsequently receiving the stored energy therefrom, said unit further including a hydraulic blocking system for operation with an incompressible fluid; said hydraulic blocking system including an incompressible fluid transmission, a fluid recipient and a secondary elastic system housed therein in mutual operative relationship with said incompressible fluid; said driving mechanism, said primary, energy storing and releasing system, said fluid transmission, and said secondary elastic system being disposed in operative relationhip, in series with one another, for energy transmission in both senses, from and to said driving mechanism, thereby to displace said fluid between both elastic systems, in the one sense on loading said primary system, and returning the fluid in the other sense on discharge of the mechanical energy from the primary system; control and check means operatively associated with said fluid transmission, said check means being operative to block displacement of said incompressible fluid and hold said primary system tensioned, and said control means being operative to render said check means ineffective, allow return of the displaced fluid and thus release upon said driving mechanism the energy stored in the primary, energy storing and releasing system.

3. An accumulator for mechanical energy comprising as a structural unit a primary elastic, energy storing and releasing system, a driving mechanism operatively connected therewith for loading said primary elastic system with mechanical energy and subsequently receiving the stored energy therefrom, said unit further including a hydraulic blocking system for operation with an incompressible fluid; said hydraulic blocking system including an incompressible fluid transmission, a fluid recipient and a secondary elastic system housed therein in mutual operative relationship with said incompressible fluid; said driving mechanism, said primary, energy storing and releasing system, said fluid transmission, and said secondary elastic system being disposed in operative relationship, in series with one another, for energy transmission in both senses, from and to said driving mechanism, thereby to displace said fluid between both elastic systems, in the one sense on loading said primary system, and returning the fluid in the other sense on discharge of the mechanical energy from the primary system; control and check means operatively associated with said fluid transmission, said check means being operative to block displacement of said incompressible fluid and hold said primary system tensioned, said control means being operative to render said check means ineffective, allow return of the displaced fluid and thus release upon said driving mechanism the energy stored in the primary, energy storing and releasing system, said elastic systems each including a spring and a piston, each spring bearing against a face of its appertaining piston, said unit further including a cylindric casing having separate cylinder spaces for reciprocation of said pistons therein, the piston of the primary system being operatively connected with said driving mechanism for reversible operation therewith; a fluid passage means between both cylinder spaces, at the sides of the free piston faces, said cylinder spaces thereby communicating with each other and confining between said free piston faces the space of said fluid transmission.

4. An accumulator for mechanical energy comprising as a structural unit a primary elastic, energy storing and releasing system, a driving mechanism operatively connected therewith for loading said primary elastic system with mechanical energy and subsequently receiving the stored energy therefrom, said unit further including a hydraulic blocking system for operation with an incompressible fluid; said hydraulic blocking system including an incompressible fluid transmission, a fluid recipient and a secondary elastic system housed therein in mutual operative relationship with said incompressible fluid; said driving mechanism, said primary, energy storing and releasing system, said fluid transmission, and said secondary elastic system being disposed in operative relationship, in series with one another, for energy transmission in both senses, from and to said driving mechanism, thereby to displace said fluid between both elastic systems, in the one sense on loading said primary system, and returning the fluid in the other sense on discharge of the mechanical energy from the primary system; control and check means operatively associated with said fluid transmission, said check means being operative to block displacement of said incompressible fluid and hold said primary system tensioned, said control means being operative to render said check means ineffective, allow return of the displaced fluid and thus release upon said driving mechanism the energy stored in the primary, energy storing and releasing system, said elastic systems each including a spring and a piston, arranged relatively to each other in reverse disposition, each spring bearing against a face of its appertaining piston, said unit further including a cylindric casing comprising a pair of cylinder spaces housing said pistons for reciprocation therein, the piston of the primary elastic system being operatively connected with said driving mechanism for reversible operation therewith, each of said pistons confining with its free face within its appertaining cylinder space a fluid space for the fluid of said transmission, a fluid passage means between both said fluid spaces, said cylinder spaces thereby communicating with each other; thereby to coordinate expansion of the spring of the one system with compression of the spring of the other system and conversely and provide within the fluid space of the secondary elastic system, by means of its spring and piston assembly, a yieldable recipient for the fluid displaced from the cylinder space of the primary elastic system, said fluid to be returned thereinto subsequently by means of the secondary elastic system; said check means being arranged in said passage and disposed so as, while the piston of the primary elastic system is displaced by the driving mechanism and the spring of this system is tensioned and loaded, to allow free displacement of the fluid through said passage, from the fluid space of decreasing stroke volume to the other fluid space, and thereon, when the motion of the piston of the primary elastic system has stopped, to close said passage.

5. An accumulator as set forth in claim 4 wherein control means operable from the outside are associated with said check means thereby to render said check means inoperative and open said passage to the return flow of said fluid displaced therebefore and thus allow the release of the energy stored in said primary elastic system for actuating the driving mechanism with the quantity of energy and velocity of its discharge as commanded by said control means.

6. An accumulator as set forth in claim 2 wherein said driving mechanism includes a shaft, a crank arm means thereon, a crank rod connected to said arm means, and a piston rod connected to said crank rod and secured to the piston of said primary elastic system, thereby to establish a reversible driving connection, over said piston rod, crank rod, and crank arm, between said piston of the primary elastic system and said shaft.

7. An accumulator as set forth in claim 2 wherein said driving mechanism includes a coupling member adapted for pivotal action about a chosen angle, said coupling member being further shaped and disposed for attaching and applying thereby said unit to a conformably shaped stationary key for operating thereby said driving mechanism and loading said accumulator for subsequent release of the stored energy.

8. An accumulator as set forth in claim 2 wherein said driving mechanism includes a coupling member adapted for pivotal action about a chosen angle, said coupling member being further shaped and disposed for attaching and applying thereby said unit to a conformably shaped stationary key for operating thereby said driving mechanism and loading said accumulator and thereon detaching said unit from said key and subsequently attaching said unit and applying it by means of said coupling member to a conformably shaped coupling member at an actuating lever of an operating device, such as a circuit breaker, switch, and the like.

9. An accumulator as set forth in claim 4 wherein check means are arranged in said fluid passage between both said cylinder fluid spaces and disposed so as, while the spring of the primary elastic system is tensioned and loaded and the piston of this system is displaced, to allow free displacement of said fluid through this passage between the fluid cylinder space of decreasing stroke volume and the fluid cylinder space of increasing stroke volume, and to close said passage when, on the loading of a certain predetermined charge, the movement of the piston of the primary elastic system has stopped; control means operable from the outside being associated with said check means, thereby to open said passage for the return of the fluid displaced therethrough and to trip the release of the energy stored in the primary elastic system and actuate thereby said driving mechanism.

10. An accumulator as set forth in claim 3 wherein said driving mechanism includes a pivotal end member of a shape for removable attachment to a conformably shaped key and subsequent attachment to a conformably shaped coupling member of an operating device, thereby, by means of said key, to drive said driving mechanism and load said primary elastic system and store therein a predetermined quantity of mechanical energy, independent of the operation of said operating device and, subsequently by attaching said unit to the coupling member of said operating device and tripping said check means, to release the stored energy thereupon for the operation of said operating device with chosen velocity of operation and intensity thereof.

11. An accumulator as set forth in claim 10 wherein said unit is of the general shape of a handle bar constituted by a cylindric casing housing said elastic systems and said fluid transmission and by a head containing said driving mechanism and coupling member, and wherein said key is a stationary fixed point whereabout to pivot said handle bar when applied thereto for loading said accumulator.

12. An accumulator as set forth in claim 4 wherein said check means is a non-return valve disposed in said passage and said control means include a ring embracing said cylindric casing at the location of said passage, said ring being shaped with a cam, a cam follower being associated therewith and with said non-return valve, said cam and said cam follower being disposed to leave, in certain positions of the ring, the body of said valve free for operation and, in other positions of the ring, to hold said body of the non-return valve lifted from its seat.

13. An accumulator for mechanical energy comprising as a structural unit a lever means, a compressible elastic system mounted on said lever means, a longitudinally movable element mounted for reciprocatory movement on said lever means, said elastic system including one extremity operatively connected to said longitudinally movable element, a coupling member accessible from the outside and revolvably mounted on and at one of said lever means, a gearing means between said longitudinally movable element and said coupling member for transmitting power and converting reciprocatory movement of said longitudinally movable element into rotary motion of said coupling member and conversely for converting a relative rotary motion of said coupling member into reciprocatory movement of said longitudinally movable element, said coupling element being further shaped and disposed for attaching and applying the unit to a conformably shaped fixed key whereby turning said lever means about said key loads said compressible elastic system, said member being adapted for alternate connection to a conformably shaped rotatable key operatively connected to an element to be driven, check means operatively associated with said elastic system for holding it in tensioned, loaded condition and tripping means operatively associated with said check means for releasing the energy stored by said elastic system when said coupling member is connected to the rotatable key so as to impart rotary motion to the same.

14. An accumulator as claimed in claim 13 wherein said check means includes a hydraulic blocking system for operation with an incompressible fluid and said hydraulic blocking system being operatively associated with said elastic system to block and hold said elastic system tensioned by means of the incompressible fluid.

15. An accumulator as claimed in claim 14 in which said hydraulic blocking system includes a cylinder means containing the incompressible fluid, a piston means in said cylinder operatively connected with said longitudinally movable element and thus with said primary elastic system, a fluid recipient means, a fluid transmission between said cylinder means and said fluid recipient means, a secondary elastic system housed within said fluid recipient means in mutual operative relationship with the incompressible fluid, said longitudinally movable member, said piston, said fluid transmission and said secondary elastic system being disposed in operative relationship in series with one another for energy transmission in opposite directions from and to said longitudinally movable member and operative to displace the incompressible fluid between the cylinder means and the fluid recipient in one direction upon loading said compressible primary elastic system and for retaining the fluid in the opposite direction on release of the energy stored in said primary elastic system and said check means including further means for blocking displacement of the incompressible fluid so as to hold the said primary elastic system tensioned.

References Cited in the file of this patent

UNITED STATES PATENTS

| 1,254,060 | Mottlan | Jan. 22, 1918 |
| 2,006,671 | Coffman | July 2, 1935 |
| 2,282,652 | Henning | May 12, 1942 |